United States Patent [19]

Riffle et al.

[11] Patent Number: 5,280,734
[45] Date of Patent: Jan. 25, 1994

[54] PARKING BRAKE ACTUATOR WITH VARIABLE RATIOS

[75] Inventors: Stephanie J. Riffle, Hartland; Gerald G. Scott, Troy, both of Mich.

[73] Assignee: Dura Mechanical Components, Inc., Troy, Mich.

[21] Appl. No.: 935,560

[22] Filed: Aug. 26, 1992

[51] Int. Cl.⁵ .......................... G05G 7/04; G05G 5/24
[52] U.S. Cl. ........................................ 74/516; 74/529; 74/540
[58] Field of Search ................ 74/516, 517, 518, 529, 74/540

[56] References Cited

U.S. PATENT DOCUMENTS

| 2,943,511 | 7/1960 | Johnstone | 74/529 |
| 4,391,159 | 7/1983 | Sellmeyer | 74/516 |
| 4,604,913 | 8/1986 | Kyonomine | 74/516 X |
| 5,054,333 | 10/1991 | Scott et al. | 74/540 X |

FOREIGN PATENT DOCUMENTS

| 2850699 | 5/1979 | Fed. Rep. of Germany | 74/540 |
| 1359571 | 3/1964 | France | 74/540 |

Primary Examiner—Allan D. Herrmann
Attorney, Agent, or Firm—David A. Greenlee

[57] ABSTRACT

A foot operated actuator is provided for actuating a cable operated vehicle parking brake. The actuator comprises an input lever pivotally mounted on a support for movement to a plurality of brake applied positions where it is held by a pawl-and-sector latch. The lever is standardized and is adapted to receive a plurality of different interchangeable sectors. The sectors have outer peripheral cable-receiving grooves which can have a variety of outer profiles which determine the constant or variable output/input ratio of output cable travel per unit of input lever travel. The lever has a hub having an arcuate surface which receives a mating arcuate surface on the sectors. The sectors each have a radially inwardly depending lobed tab that is axially received in an axially open mating slot on the hub to lock the sectors to the hub.

12 Claims, 1 Drawing Sheet

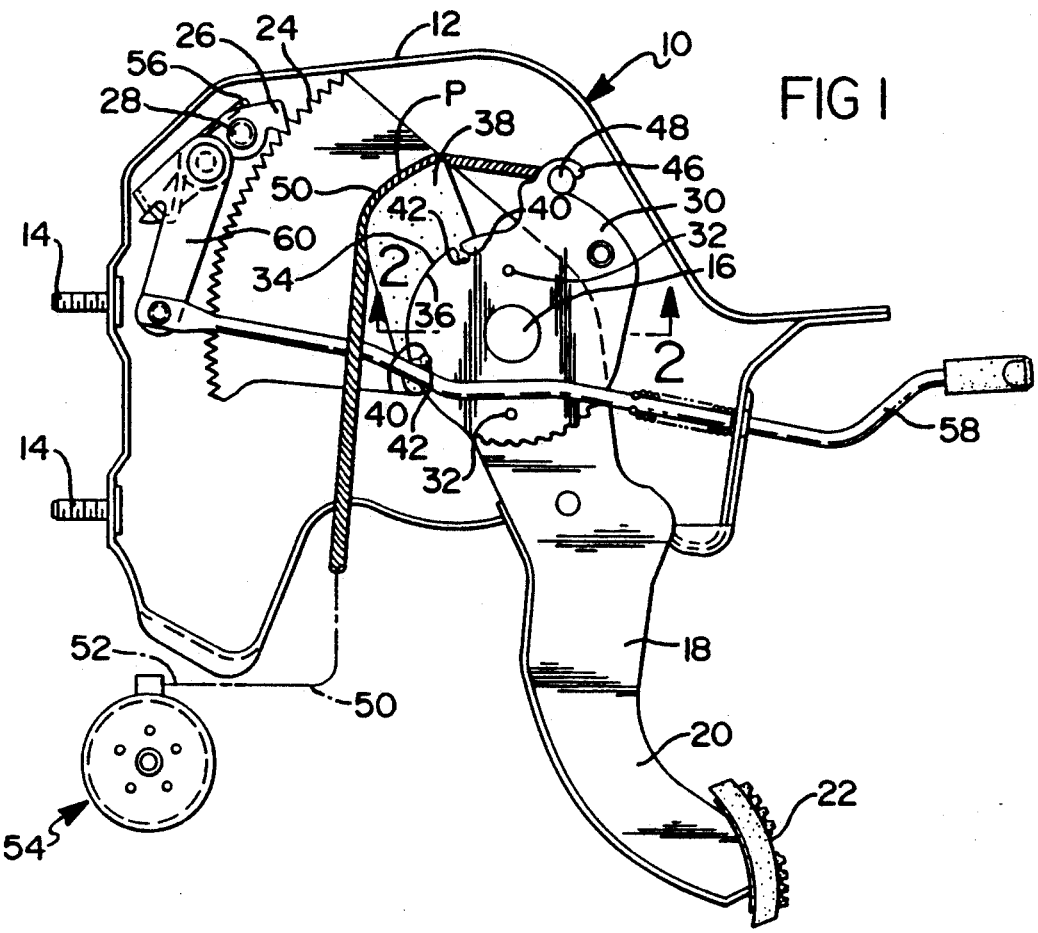
FIG 1
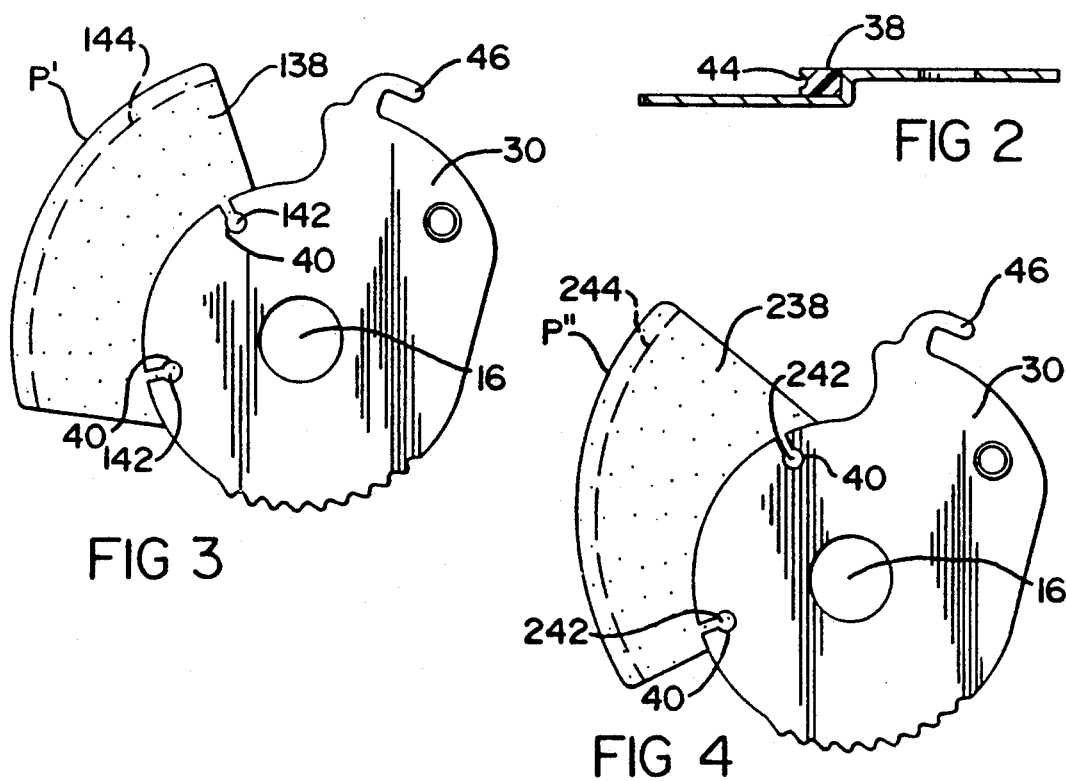
FIG 2
FIG 3
FIG 4

PARKING BRAKE ACTUATOR WITH VARIABLE RATIOS

BACKGROUND OF THE INVENTION

This invention relates generally to parking brake vehicle actuators and, more particularly, to parking brake actuators having a variable ratio capability.

Many different types of actuators have been developed to operate vehicle parking brakes. Manual actuators utilizing both hand-operated and foot-operated input levers which actuate the parking brake through movement of a flexible cable are the most popular type in current use. In these actuators, the force exerted by the vehicle operator's hand or foot on the input lever is translated into an output force on the cable to apply the parking brake. A releasable latch, usually in the form of a pawl and sector, automatically latches the lever in the selected brake applied position.

In these manual parking brake actuators, the relationship of operator input movement to parking brake cable output movement (i.e. mechanical advantage) is dependent on several factors comprising the environment of the actuator lever relative to the operator. Some of these factors are lever arm size, hand or foot operation, lever travel space available, amount of input effort required to apply the parking brake, and operator positioning relative to the lever.

As a result of differing environments, some of these actuators utilize constant ratios of input lever movement to output cable movement. In others, a variable ratio of input lever movement to output lever movement is utilized to provide for relatively constant input effort as the output force requirements to further apply the parking brake increase. The input/output ratio will therefore vary depending on the requirements of a particular vehicle environment. Different vehicle environments dictate that different constant or variable ratios be utilized.

Heretofore, each different vehicle environment dictated use of a different actuator, which was usually developed specifically for a particular environment. As a result, scores of different parking brake actuators have been designed and are manufactured and in use.

It would be desirable to reduce the number of different parking brake actuators needed for the variety of different vehicle environments by developing a parking brake actuator which utilizes predominately standard parts common to all actuators.

It would also be desirable to develop a parking brake actuator that utilizes a standard basic actuator and a plurality of interchangeable inserts which adapt the actuator to the variety of constant and variable input/output ratio environments.

SUMMARY OF THE INVENTION

It is therefore an object of this invention to reduce the bumber of different parking brake actuators needed for the variety of different vehicle environments by developing a parking brake actuator which utilizes predominately standard parts common to all actuators.

Another object of this invention is to provide a parking brake actuator that utilizes a standard basic actuator and a plurality of interchangeable inserts which adapt the actuator to the variety of constant and variable input/output ratio environments.

In one aspect, this invention features an actuator for operating a vehicle parking brake, comprising a support bracket on the vehicle, an input lever, an output cable operably interconnecting the lever and the parking brake, means pivotally mounting the lever on the support bracket for movement between a brake disengaged position and a plurality of brake engaged positions, and lever latching means for releasably latching the lever in a brake engaged position, characterized by including a cable guide for guiding movement of the cable relative to the lever to produce a predetermined output/input ratio of cable travel per unit of lever travel during movement of the lever from disengaged and engaged positions and guide mounting means removably mounting the cable guide on the lever.

In another aspect, this invention features the cable guide being a sector having an outer peripheral cable-receiving groove of a predetermined profile to regulate the radial distance of the point of effective operating engagement of the cable with the lever to control the output/input ratio during movement of the lever between positions.

In yet another aspect, this invention features the lever having a central hub, and the guide mounting means comprising mating arcuate surfaces on the sector and on the lever hub and interengageable locking means on the sector and on the hub for releasably locking the sector on the hub.

Preferably, the provision of a plurality of interchangeable sectors each having a different profile and each having said mating arcuate surfaces and said interengageable locking means for removably mounting the sector on the lever hub. The interengageable locking means comprises an inwardly directed lobed tab depending from each sector arcuate surface, and a matingly configured inwardly directed slot on the hub arcuate surface for lockingly receiving the tab.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is an elevation of a parking brake actuator, having a replaceable cable guide according to this invention;

FIG. 2 is a sectional view of the parking brake actuator, taken along line 2—2 of FIG. 1;

FIG. 3 is an elevational view of a cable guide having a different profile than illustrated in FIG. 1; and FIG. 4 is an elevational view of a cable guide having a different profile than illustrated in FIGS. 1 and 3.

DETAILED DESCRIPTION OF A PREFERRED EMBODIMENT

Referring now to FIG. 1 of the drawings, a parking brake actuator 10 includes a steel mounting bracket 12 which is secured to a vehicle structure, normally beneath the vehicle's instrument panel (not shown), by mounting bolts 14. Bracket 12 mounts a pivot pin 16 which secures a steel input pedal lever 18 pivotally to mounting bracket 12.

Lever 18 has a depending portion 20 that mounts a pedal pad 22 which is engageable by the vehicle operator's foot to operate the parking brake 10. At its distal end lever 18 includes a toothed sector 24 which is engageable by latching pawl 26 that is pivoted at 28 to mounting bracket 12. A cable anchor plate 30 is riveted to lever 18 at 32 for movement with pedal 18 as it is operated.

Anchor plate 30 has an arcuate mounting surface 34 which mates with mating surface 36 of plastic cable guide 38. Anchor plate 30 has a pair of peripheral keyhole-shaped slots 40 directed inwardly of surface 34 that receive mating lobed tabs 42 which depend from arcuate surface 36 to lock cable guide 38 to anchor plate 30.

Cable guide 38 has an outer curved surface which includes a groove 44 having a profile P. Anchor plate 30 includes a finger 46 that confines the inner end 48 of brake cable 50. The outer end 52 of cable 50 is conventionally operatively connected to a parking brake, shown schematically at 54.

Cable guide 38 is assembled by placing it beside lever 18 with tabs 42 axially aligned with slots 40 and sliding the tabs into the slots until it abuts toothed sector 24, as shown in FIG. 2. Since the lobes on tabs 42 are larger than the necks' od of slots 40, cable guide 38 is mounted to lever 18 against movement radially of pivot pin 16.

Depressing movement (clockwise, as viewed in FIG. 1) of pedal lever 18 will tension cable 50 and apply parking brake 54. Depending on cable stretch and brake wear, the amount of depression of lever 18 required to fully apply parking brake 54 will vary. Lever 18 will be held latched in any depressed position, by engagement of pawl 26 which is biased into contact with toothed sector 24 by a spring 56. The brake is released by manual operation of a release lever 58 which moves link 60 that disengages pawl 26 from toothed sector 24 against the bias of spring 56. Cable 50 will pull lever 18 back to disengaged position.

The profile P of groove 44 of cable guide 38 features a radius (measured from the center of pivot pin 16) which remains constant and then rapidly decreases in the counterclockwise direction. Thus, as the parking brake is applied by depressing lever 18, the ratio of cable travel per unit of lever travel will likewise remain constant and then decrease.

FIG. 3 illustrates a modified form of cable guide 138 in which cable guide groove 144 has a profile P' with a constant radius. Thus, use of cable guide 138 will maintain the output/input ratio constant during application of parking brake 54. FIG. 4 illustrates yet another cable guide 238 which has a cable guide groove 244 having a profile P'' that has a constantly decreasing radius. Application of brake 54 will provide a resultant constant decrease in the output/input ratio.

Other cable guides having different profiles which produce different constant or variable output/input ratios of cable travel per unit of lever travel can also be used with parking brake actuator 10. The provision of interchangeable cable guides which can be simply assembled to a common pedal lever greatly simplifies the manufacture of parking brake actuators for a variety of vehicle environments. Similarly, this invention is obviously readily adaptable for use with hand-operated parking brake actuators.

While only a preferred embodiment has been illustrated and described, obvious modifications thereof are contemplated within the scope of this invention and the following claims.

We claim:

1. An actuator for operating a vehicle parking brake, comprising a support bracket on the vehicle, an input lever, an output cable operably interconnecting the lever and the parking brake and having one end secured to the lever, means pivotally mounting the lever on the support bracket for input movement between a brake disengaged position and a plurality of brake engaged positions, and lever latching means for releasably latching the lever in a brake engaged position, characterized by including a cable guide for progressively operatively engaging the cable and guiding movement of the cable relative to the lever to produce a predetermined output/input ratio of cable travel per unit of lever travel during movement of the lever from disengaged to engaged positions and guide mounting means removably securing the cable guide on the lever for movement therewith as a unit.

2. The actuator of claim 1, further characterized by the provision of a plurality of interchangeable cable guides each providing a different predetermined output/input ratio and each removably mountable on the lever by the guide mounting means.

3. The actuator of claim 1, further characterized by the cable guide being a sector having an outer peripheral cable-receiving groove of a predetermined profile to regulate the radial distance of the point of effective operating engagement of the cable with the lever to control the input/output ratio during movement of the lever between positions.

4. The actuator of claim 3, further characterized by by the lever having a central hub, and the guide mounting means comprising mating arcuate surfaces on the sector and on the lever hub and intergageable locking means on the sector and on the hub for releasably locking the sector on the hub.

5. The actuator of claim 4, further characterized by the provision of a plurality of interchangeable sectors each having a different profile and each having said mating arcuate surfaces and said interengageable locking means for removably mounting the sector on the lever hub.

6. The actuator of claim 5, further characterized by the interengageable locking means comprising an inwardly directed lobed tab depending from each sector arcuate surface, and a matingly configured inwardly directed slot on the hub arcuate surface for lockingly receiving the tab.

7. The actuator of claim 6, further characterized by the hub slot being open axially of the lever to receive the lobed tab and enable axial assembly of the sector to the lever hub, while securing the sector against movement radially of the hub.

8. The actuator of claim 5, wherein one of said interchangeable sectors has a profile providing a predetermined constant output/input ratio of cable travel per unit of lever travel.

9. The actuator of claim 8, wherein another of said interchangeable sectors has a profile providing a predetermined variable output/input ratio of cable travel per unit of lever travel.

10. The actuator of claim 9, wherein another of said interchangeable sectors has a profile providing a second different predetermined constant output/input ratio of cable travel per unit of lever travel.

11. An actuator for operating a vehicle parking brake, comprising a support bracket on the vehicle, an input lever having a central hub, an output cable operably interconnecting the lever and the parking brake, means pivotally mounting the lever on the support bracket for input movement between a brake disengaged position and a plurality of brake engaged positions, and lever latching means for releasably latching the lever in a brake engaged position, characterized by a cable guide comprising a sector having an outer peripheral cable-receiving groove of a predetermined profile to regulate the radial distance of the point of effective operating engagement of the cable with the lever to control the engagement of the cable with the lever to control the input/output ratio during movement of the lever from disengaged to engaged positions, by guide mounting means comprising mating arcuate surfaces on the sector and on the lever hub and interengageable locking means on the sector and on the hub for releasably locking the sector on the hub to removably mount the cable guide on the lever, said interengageable locking means comprising an inwardly directed lobed tab depending from each sector arcuate surface, and a matingly configured inwardly directed slot on the hub arcuate surface for lockingly receiving the tab, and by provision of a plurality of interchangeable sectors each having a different profile and each having said mating arcuate surfaces and said interengageable locking means for removably mounting the sector on the lever hub.

12. The actuator of claim 11, further characterized by the hub slot being open axially of the lever to receive the lobed tab and enable axial assembly of the sector to the lever hub, while securing the sector against movement radially of the hub.

* * * * *